(12) United States Patent
Dutt et al.

(10) Patent No.: US 6,718,818 B2
(45) Date of Patent: Apr. 13, 2004

(54) METHOD OF SENSING AIR LEAKS IN TIRES AND TIRE TESTING MACHINES

(75) Inventors: William Randall Dutt, Copley, OH (US); John Edward Fahringer, Fairlawn, OH (US); John Michael Maloney, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 16 days.

(21) Appl. No.: 10/199,547

(22) Filed: Jul. 19, 2002

(65) Prior Publication Data

US 2004/0011117 A1 Jan. 22, 2004

(51) Int. Cl.⁷ .............................. G01M 3/26; G01M 3/16
(52) U.S. Cl. .............................. 73/49; 73/49.2; 73/49.3; 73/146.2
(58) Field of Search ................................. 73/40, 40.5 R, 73/40.5 A, 40.7, 41, 41.2, 41.3, 41.4, 45, 45.1, 45.2, 45.3, 45.4, 45.5, 45.6, 45.7, 45.8, 46, 47, 48, 49, 49.1, 49.2, 49.3, 49.4, 49.5, 49.6, 49.7, 49.8, 52, 146, 146.2

(56) References Cited

U.S. PATENT DOCUMENTS

| | | | |
|---|---|---|---|
| 3,175,390 A | * 3/1965 | McConkie | 73/49 |
| 3,739,533 A | 6/1973 | Iida et al. | 451/1 |
| 3,942,922 A | * 3/1976 | Cole et al. | 425/30 |
| 3,946,527 A | 3/1976 | Beer | 451/58 |
| 4,043,355 A | * 8/1977 | Cerruti et al. | 137/312 |
| 4,221,124 A | * 9/1980 | Jones | 73/40 |
| 4,355,924 A | * 10/1982 | Husemann et al. | 405/145 |
| 4,491,013 A | * 1/1985 | Bubik | 73/146 |
| 4,612,798 A | * 9/1986 | Roberts | 73/40.7 |
| 4,702,287 A | * 10/1987 | Higbie et al. | 141/4 |
| 4,834,159 A | * 5/1989 | Burger | 157/1 |
| 4,914,869 A | 4/1990 | Bayonnet et al. | 451/5 |
| 4,916,943 A | * 4/1990 | Himmler et al. | 73/146 |
| 4,975,679 A | * 12/1990 | Ballyns | 340/442 |
| 5,263,284 A | 11/1993 | Wild | 451/5 |
| 5,327,346 A | * 7/1994 | Goodell | 701/71 |
| 5,417,900 A | * 5/1995 | Martin, Sr. | 264/40.5 |
| 5,767,398 A | * 6/1998 | Naedler | 73/146.2 |
| 6,269,691 B1 | * 8/2001 | Sowatzke et al. | 73/146.2 |
| 6,330,821 B1 | * 12/2001 | Arnold et al. | 73/40 |
| 6,330,822 B1 | * 12/2001 | Hawk et al. | 73/40.7 |
| 6,393,897 B1 | * 5/2002 | Arnold et al. | 73/40.7 |
| 6,401,524 B1 | * 6/2002 | Incavo et al. | 73/40 |
| 6,481,265 B1 | * 11/2002 | Weber | 73/40 |
| 6,604,414 B1 | * 8/2003 | Claussen et al. | 73/146 |

OTHER PUBLICATIONS

Cubberly, William H., SAE Dictionary of Aerospace Engineering, 1992, p. 329.*

* cited by examiner

Primary Examiner—Hezron Williams
Assistant Examiner—David A. Rogers
(74) Attorney, Agent, or Firm—Howard M. Cohn

(57) ABSTRACT

The present invention relates to a method and system for detecting air leaks in tires and in a tire testing machine. Each of the tires is mounted on the tire testing machine; inflated with an air flow from an inflation system to a first pressure; and maintained at the first pressure by continued supply of air from the inflation system into the tire. The flow of the continued supply of air is measured with a calorimetric flow sensor calibrated to output a sensor signal having a full scale value corresponding to an identical model tire mounted on the tire testing machine with no air leaks in the model tire or the testing machine. The flow of the continued supply of air is compared with an averaged flow for previously measured tires mounted on the tire testing machine with no air leaks in the tires or the testing machine. A control signal indicating an air leak is outputted if the sensor signal is 20% to 80% of the full scale value.

20 Claims, 4 Drawing Sheets

METHOD OF SENSING AIR LEAKS IN TIRES AND TIRE TESTING MACHINES

TECHNICAL FIELD

The present invention generally relates to the sensing of air leaks in tires and tire manufacturing machines, and more specifically to the sensing of small air leaks in a tire mounted on a tire uniformity machine and the leakage of air from the tire uniformity machine.

BACKGROUND OF THE INVENTION

In the art of manufacturing pneumatic tires, rubber flow in the tire mold or minor differences in the dimensions of the belts, beads, liners, treads, plies of rubberized cords, etc., sometimes cause non-uniformities in the final tire. Non-uniformities of sufficient amplitude will cause force variations on a surface, such as a road, against which the tires roll producing vibration and noise. When such variations exceed an acceptable maximum level, the ride and handling of a vehicle utilizing such tires will be adversely affected.

Tire uniformity machines are used to monitor the quality of the tire production process and may guide or incorporate corrective measures such as the grinding to improve the balance and uniformity of a tire. In general, a tire uniformity machine (TUM) subjects a tire to normal conditions of mounting, pressurization, rotation and load while collecting measurement data on variations of deflection, force and velocity. A tire uniformity machine typically includes an assembly for rotating a tire against the surface of a rotating loading wheel. In tis testing arrangement, the loading wheel is moved in a manner dependent on the forces exerted by the rotating tire and those forces are measured by appropriately placed measuring devices. When a tire being tested yields less than acceptable results, shoulder and/or center rib grinders can be used to remove a small amount of the tire tread at precisely the location of the non-uniformities detected by the measuring devices. In a sophisticated tire uniformity machine, the measurements are stored and interpreted in digital form by a computer and rubber is removed from the tire tread using grinders controlled by the computer. Examples of machines utilizing these methods are disclosed in U.S. Pat. Nos. 3,739,533; 3,946,527; 4,914,869 and 5,263,284.

The TUM as well as other tire testing and manufacturing machines require that a tire be mounted and quickly inflated to a desired pressure. For example, with a TUM, the tire being tested is mounted and inflated to the desired pressure, typically about 30 pounds per square inch (psi) in about 1 to 2 seconds. The speed of inflation is an important factor since the tests are being conducted on the factory floor. Unavoidably, the tires themselves sometimes have small even microscopic air leaks. In other cases the TUM's or other tire manufacturing machines can themselves have small air leaks in the inflation circuits. Since the TUMs and other such testing and manufacture machines are connected to a high pressure air source, the air leakage, microscopic sized holes in the tire and/or the air leaks in the in the inflation circuit of the machines are not recognized.

Since both recognition of flaws in tires before sending them to a customer and elimination of defects of the tire uniformity machine are important to save money, there is a need for improved methods to monitor air leakage during the uniformity measurement of a tire mounted on a TUM or other tire testing and manufacturing machines. Moreover, it is also important to detect air leaks in the in the inflation circuit of the machines for reasons of economy.

SUMMARY OF THE INVENTION

The present invention relates to a method for detecting air leaks in tires and in a tire testing machine. The method includes mounting each of the tires on the tire testing machine; inflating each or the tires with an air flow from an inflation system to a first pressure; maintaining each of the tires at the first pressure by continued supply of air from the inflation system into the tire; measuring the flow of the continued supply of air with a calorimetric flow sensor calibrated to output a sensor signal having a full scale value corresponding to an identical model tire mounted on the tire testing machine with no air leaks in the model tire or the testing machine; comparing the flow of the continued supply of air with an averaged flow for previously measured tires mounted on the tire testing machine with no air leaks in the tires or the testing machine; and outputting a control signal indicating an air leak if the sensor signal is 20% to 100% of the full scale value.

The method includes calibrating the calorimetric flow sensor so that 50% of the full scale value corresponds to a pre-selected sized hole in the model tire, less than 50% is an indication of a smaller hole than the pre-selected hole in the model tire and more than 50% is an indication of a larger hole than the pre-selected hole in the model tire.

The method of measuring the flow of the continued supply of air with a calorimetric flow sensor includes the step of measuring the caloric depletion from the continued supply of air maintaining the tire at the first pressure.

The method also includes generating an alarm signal signaling to check for sensor failure if the sensor signal is at full scale value for a predetermined number of tires mounted onto the testing machine.

The method further includes stopping the tire testing machine, marking the tire and/or sending the tire down a scrap conveyor whenever the sensor signal is 20% to 100% of the full scale value.

The method further includes inflating each of the tires with an air flow from an inflation system to a second pressure to set tire beads of the fire on machine rims of the testing machine; and deflating each of the tires to the first pressure corresponding to a rated pressure of the tire.

The method includes loading each of the tires by a load wheel of the tire testing machine; and subjecting each of the tires to normal conditions of mounting, inflation, load and rotational speed while measuring and collecting tire uniformity measurement data;

The method includes setting a pressure control signal with a computer corresponding to the first pressure to which the tire will be inflated; directing the pressure control signal through a signal line to a pneumatic servo valve; controlling a pneumatic air booster disposed in an air line carrying the air flow to each of the tires with the pneumatic servo valve so that the air flow through the pneumatic air booster is controlled in order that the pressure in the tire is at the first pressure set by the computer.

The method of measuring the flow of the continued supply of air includes the measurement of an air flow of less than 1 SCFM; and inflating the tire with an air flow from the inflation system to a second pressure with an air flow of up to 1200 SCFM.

The system of the present invention relates to a system for detecting air leaks in tires and in a tire testing machine. The system includes means for mounting each of the tires on the tire testing machine; means for inflating each of the tires with an air flow from an inflation system to a first pressure;

means for maintaining each of the tires at the first pressure by continued supply of air from the inflation system into the tire; means for measuring the flow of the continued supply of air with a calorimetric flow sensor calibrated to output a sensor signal having a full scale value corresponding to an identical model tire mounted on the tire testing machine with no air leaks in the model tire or the testing machine; means for comparing the flow of the continued supply of air with an averaged flow for previously measured tires mounted on the tire testing machine with no air leaks in the tires or the testing machine; and means for outputting a control signal indicating an air leak if the sensor signal is 20% to 100% of the full scale value.

The system further includes means for calibrating the calorimetric flow sensor so that 50% of the full scale value corresponds to a pre-selected sized hole in the model tire, less than 50% is an indication of a smaller hole than the pre-selected hole in the model tire and more than 50% is an indication of a larger hole than the pre-selected hole in the model tire.

The system further includes means for generating an alarm signal signaling to check for sensor failure if the sensor signal is at its minimum value for a predetermined number of tires mounted onto the testing machine.

The system further includes means for stopping the tire testing machine, marking the tire and/or sending the tire down a scrap conveyor whenever the sensor signal is 20% to 100% of the full scale value.

The system also includes means for inflating each of the tires with an air flow from an inflation system to a second pressure to set tire beads of the tire on machine rims of the testing machine; and means for deflating each of the tires to the first pressure corresponding to a rated pressure of the tire.

The system also includes means for setting a pressure control signal with a computer corresponding to the first pressure to which the tire will be inflated; means for directing the pressure control signal through a signal line to a pneumatic servo valve; and means for controlling a pneumatic air booster disposed in an air line carrying the air flow to each of the tires with the pneumatic servo valve so that the air flow through the pneumatic air booster is controlled in order that the pressure in the tire is at the first pressure set by the computer.

The system including means for measuring the caloric depletion from the continued supply of air maintaining the tire at the first pressure, means for measuring the flow of the continued supply of air includes means for measuring an air flow of less than 1 SCFM and means for inflating the tire with an air flow from the inflation system to a second pressure with an air flow of up to 1200 SCFM.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
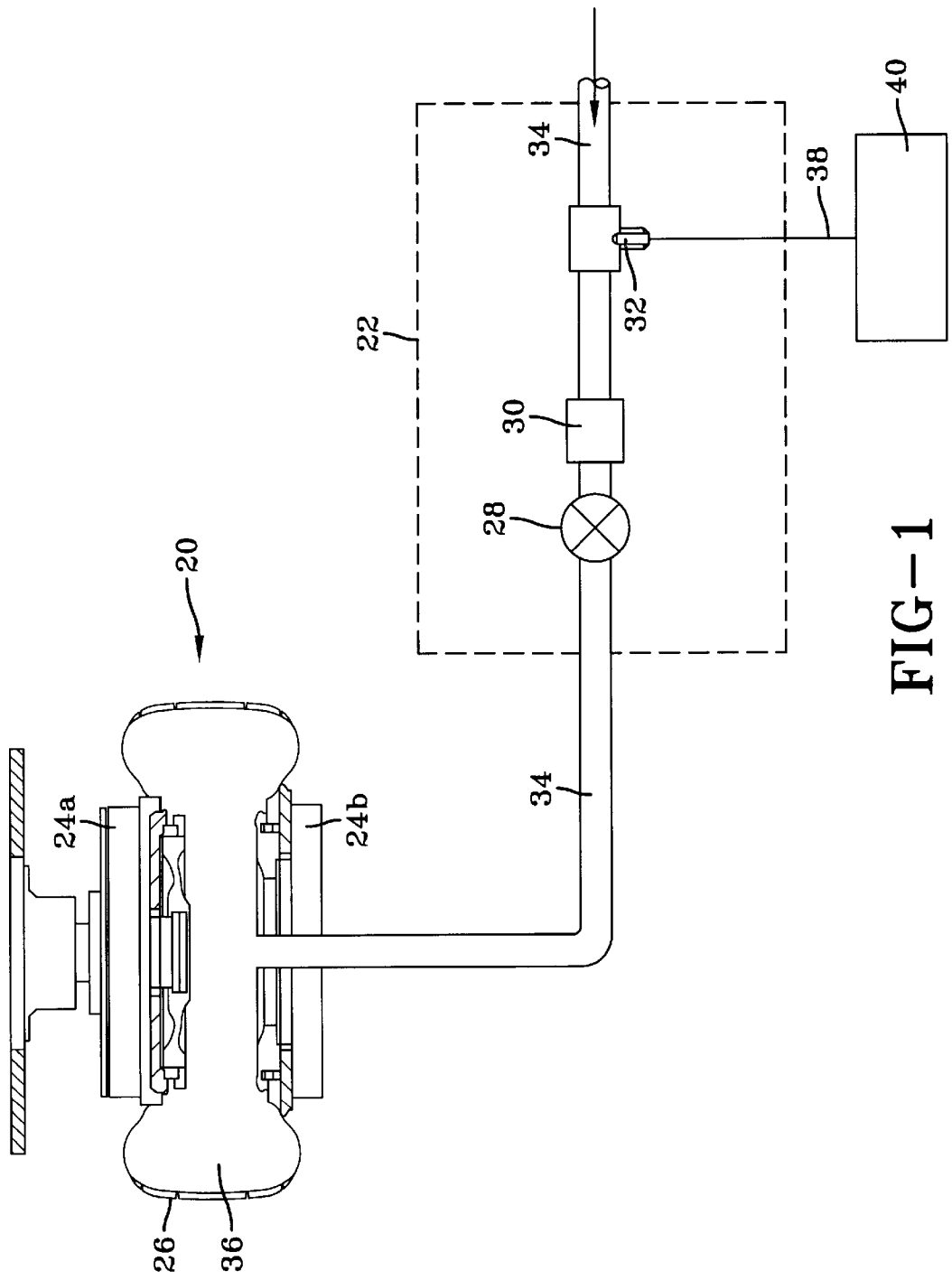
Figure 2:
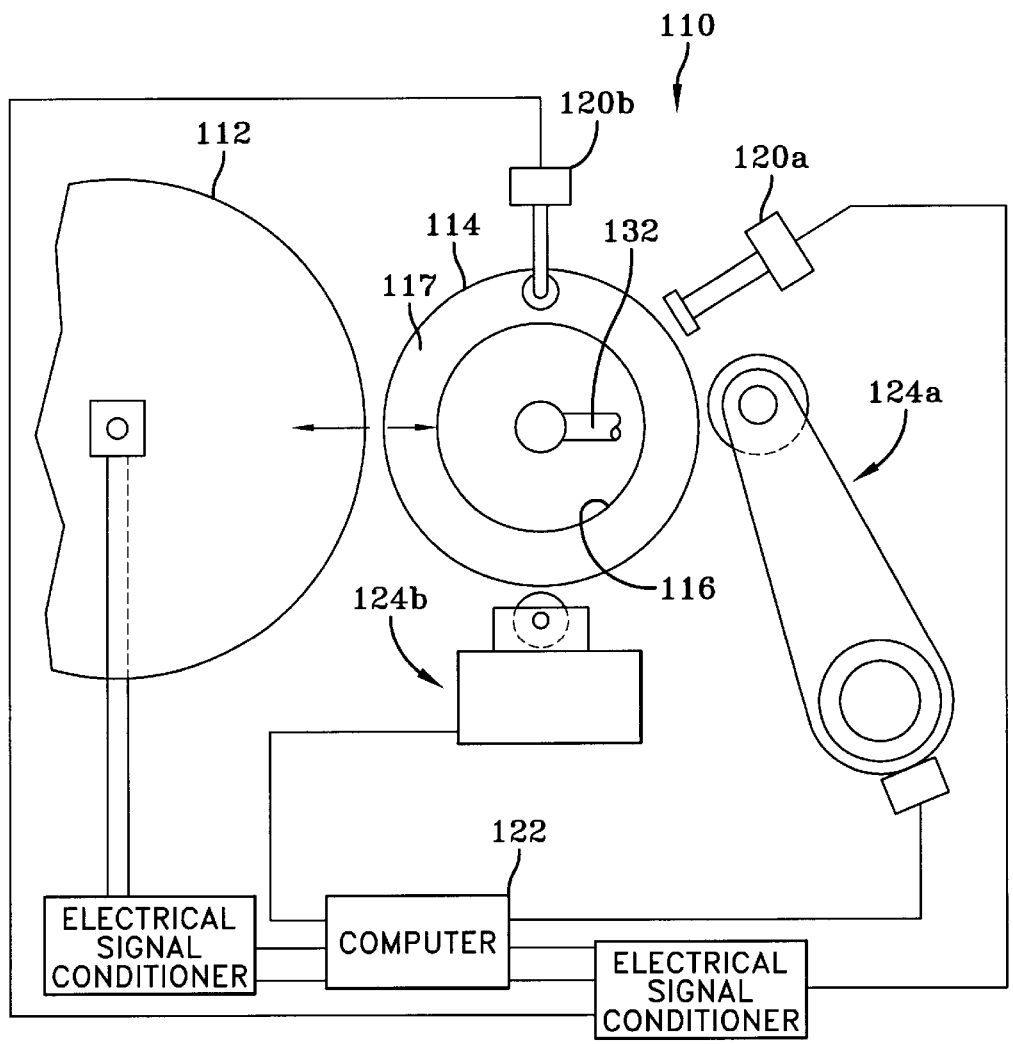
Figure 3:
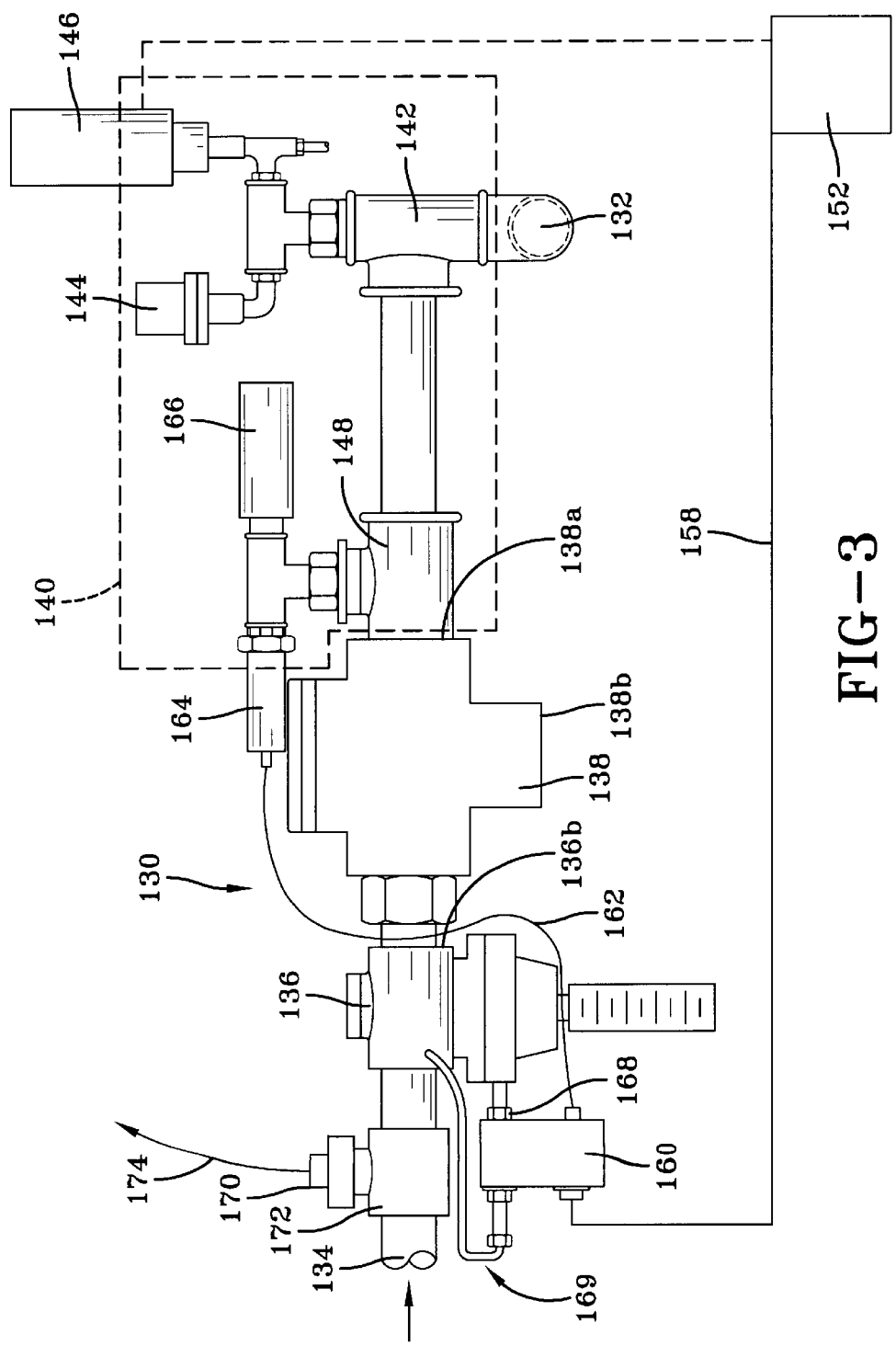
Figure 4:
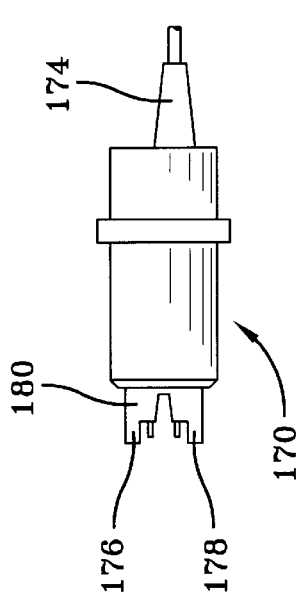
Figure 6:
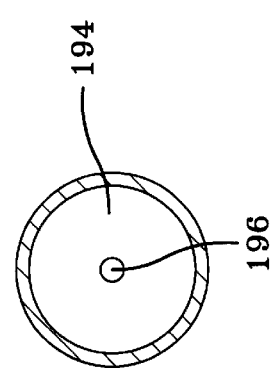
Figure 5:
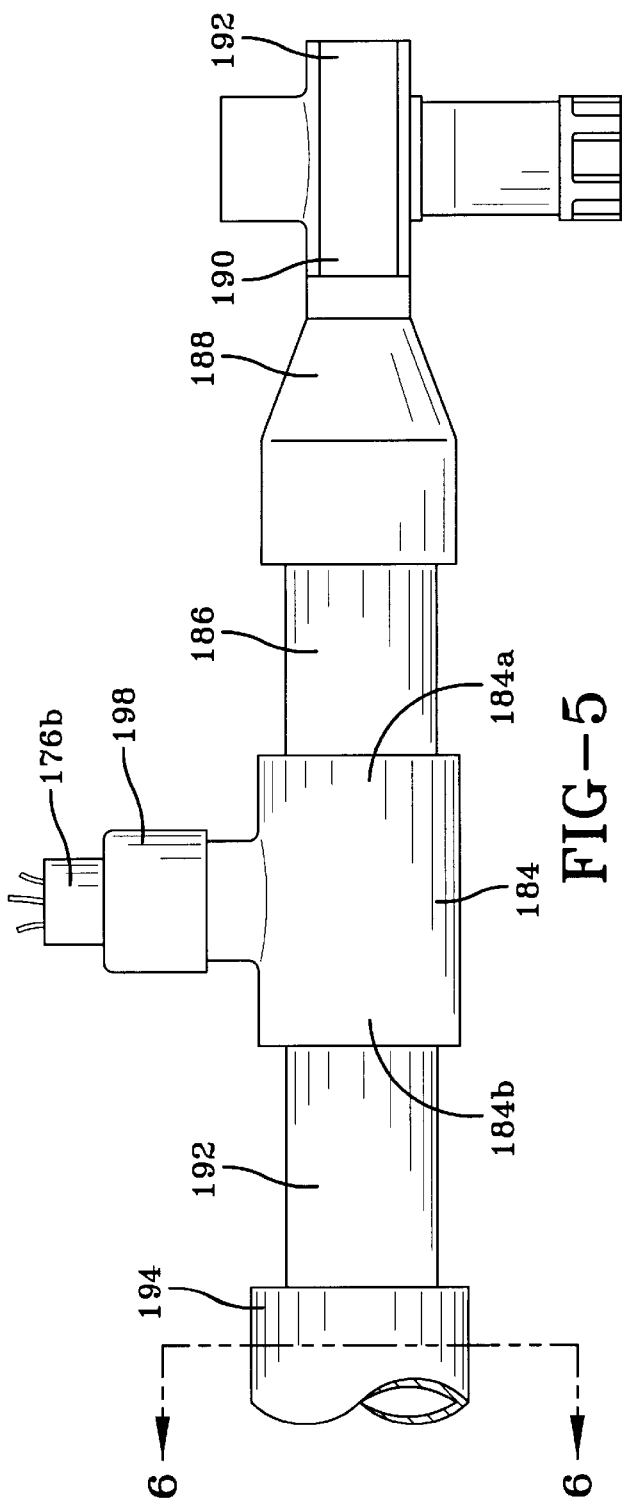

The structure, operation, and advantages of the present preferred embodiment of the invention will become further apparent upon consideration of the following description taken in conjunction with the accompanying drawings, wherein:

FIG. 1 is a representative view of an inflation system of a tire manufacturing machine in accordance with the present invention;

FIG. 2 is a representative view of a tire uniformity machine (TUM) with a tire mounted thereon in accordance with the present invention;

FIG. 3 illustrates an air inflation system in accordance with the present invention;

FIG. 4 illustrates an air flow sensor in accordance with the present invention;

FIG. 5 illustrates a calibration system in accordance with the present invention; and FIG. 6 illustrates a cross section of an end cap with a small hole in accordance with the present invention;

DEFINITIONS

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cyclical data" means data having repeating characteristics with a regular periodic frequency or time interval.

"Equatorial Plane" means the plane perpendicular to the tire's axis of rotation and passing through the center of its tread; or the plane containing the circumferential centerline of the tread.

"Lateral" means a direction going from one sidewall of the tire towards the other sidewall of the tire, generally across the tread perpendicular to the tire circumference.

"Radial" and "radially" mean directions radially toward or away from the axis of rotation of the tire.

"Radial Ply Tire" means a belted or circumferentially-restricted pneumatic tire in which at least one ply has cords which extend from bead to bead and are laid at cord angles between 65 degrees and 90 degrees with respect to the equatorial plane of the tire.

"Sidewall" means that portion of a tire between the tread and the bead.

"Tangential" and "Tangentially" refer to segments of circular curves that intersect at a point through which can be drawn a single line that is mutually tangential to both circular segments.

"Tread" means the ground contacting portion of a tire.

DETAILED DESCRIPTION OF THE INVENTION

Referring now to the drawings, which are for purposes of illustrating a preferred embodiment of the invention only, and not for purposes of limiting the invention, FIG. 1 shows tire testing or manufacturing equipment 20 with a precision inflation circuit 22. Such tire testing equipment 20 includes but is not limited to a tire uniformity machine, a balance machine and a white sidewall grinder. As shown in FIG. 1, the tire testing equipment 20 includes tire rims 24a, 24b to mount a tire 26. The precision inflation circuit 22 includes an on-off valve 28, a precision air regulator 30, and a flow sensor 32. An air supply (not shown) directs a flow of air (represented by an arrow) into an air line 34. The air flow passes through the precision inflation circuit 22 into the tire cavity 36 of tire 26. The air flow sensor 32 has an output data line 38 connected to a computer 40. The air flow sensor 32 can measure the flow speed of the air flowing from the air supply to the tire 26 and generate an air flow signal directed through data line 38 to the computer 40. The air flow signal can be compared within computer 40 with stored air flow signals generated by previously measured tires to determine whether the tire has an air leak or the machine itself is leaking. A fuller description of this system 20 wherein the system is incorporated in a tire uniformity machine follows.

FIG. 2 shows a schematic of a conventional tire uniformity machine (TUM) 110 used to measure forces, primarily, but also velocities and displacements, all of which are generated by tire non-uniformity. A load wheel 112 applies a load to a tire 114 (corresponding to tire 26 of FIG. 1) mounted on tire rims 116 (corresponding to tire rims 24a, 24b of FIG. 1) that are rotated by a drive motor (not shown). One or more sensors 120a, 120b, collectively known as 120, measure the lateral, tangential, and radial forces exerted by the tire 114. Lateral forces occur perpendicular to the plane in which the tire 114 rotates. Tangential forces act tangentially to the tire's circumference. Radial forces act parallel to a radius of the tire 114. The measurements are made electronically by the tire uniformity machine 110 and then converted to force measurements (or velocity, displacement, etc). The individual uniformity measurement data points are collected in computer 122 as the tire 114 mounted on the rim 116 rotates through 360 degrees (and beyond for multiple rotations). Uniformity measurement signals are preferably transferred to the computer 122 for analysis and possible storage. The tire uniformity measurements are an indicator of tire quality related to uniformity, and can be used to accept or reject the measured tire based on predetermined quality criteria. Optional grinders 124a, 124b collectively known as 124, can be incorporated in the tire uniformity machine 110 in order to correct the tire 114 uniformity, thereby improving its quality, by grinding as determined by the computer 122 which utilizes the uniformity measurements.

Referring again to FIG. 2, a tire 114 that is to be measured on the tire uniformity machine 110 is initially mounted onto the machine rims 116 and inflated with an air flow through air line 132 from an inflation system 130 as shown in FIG. 3. The inflation system 130 has an input supply line 134 connected to a filtered, clean, dry air supply (not shown). The air flow indicated by an arrow flows into supply line 134 and through a pneumatic air booster 136, which controls the air flow through the system 130 by means described hereinafter.

Next, the air flows from the outlet end 136b of air booster 136 into an on/off valve 138. The on/off valve 138 has an outlet end 138a which directs the air flow to the tire through line 132 and an air exhaust end 138b to exhaust air from the tire being tested. Continuing downstream, the air flow from on/off valve 138 continues into a fill circuit 140 which includes a pressure transducer 164, pressure relief valve 166, low pressure switch 144, maximum pressure safety switch 146 and fill line 132.

An operator sets the pressure control signal with the computer 152 (corresponds to computer 122 in FIG. 2 and computer 40 in FIG. 1) corresponding to the test pressure to which the tire 114 will be inflated through line 132. The computer 152 directs the pressure control command signal, which is proportional to the air pressure in the tire 114, through signal line 158 to the pneumatic servo valve 160. Effectively, the command signal initiated at the computer 152 sets the pressure of the pneumatic servo valve 160. The pneumatic servo valve 160 has two feedback loops. There is an external feedback loop through a circuit line 162, which is connected to a pressure transducer 164 in the fill circuit 140 at the downstream side of the on/off valve 138. The pressure transducer 164 monitors pressure at the outlet end 138a of on/off valve 138. Note that a safety relief valve 166 is provided in the tire fill circuit 140 across from the pressure transducer 164 to relieve the circuit in the event that the pressure is too high. The pneumatic servo valve 160 also includes an internal feedback loop including a line 168 connected at one end to the pneumatic servo valve 160 and to the other end to the control port of pneumatic air booster 136. Note that air supply line 169 is connected to the inlet side of the pneumatic booster 136 and to the pneumatic servo valve 160 to provide control air to the pneumatic booster. The pneumatic servo valve 160 functions to control the pneumatic air booster 136 so that the air flow through the pneumatic air booster is controlled so that the pressure in the tire is at the test pressure set by the computer 152. Note that the pressure transducer 164 sends a signal to the computer 152 through line 162. The signal through line 162 corresponds to the pressure in the tire at that time so that the pneumatic servo valve 160 can adjust the pneumatic servo valve 160 to provide precision control of the air flow from the air supply into air supply line 134 and finally through line 132 so as to maintain the tire at the selected test pressure.

An important aspect of the present invention relates to an air flow sensor 170, which is mounted into a manifold 172 disposed in the air supply line 134 upstream from air booster 136.

Referring to FIG. 4, there is illustrated the air flow sensor 170 with a signal output line 174 extending from one end and the sensor head 176 at the other end. An example of a suitable sensor element 176 is a Vent-Captor Type 3205.30/5 compact air flow meter from Weber Sensors Inc. of Woodstock, Ga. The air flow sensor 170 has two ceramic probe elements 178, 180 incorporated on and projecting outward from the sensing element 176. One of the probe elements measures the temperature of the air flowing through the air supply line 134 and the other probe element measures the temperature change due to heat dissipation that has occurred as a result of a change in the flow speed of the air moving through air supply line 134.

Prior to mounting air flow sensor 170 into the air inlet line 134, the sensor is preferably calibrated in calibration system 182, as shown in FIG. 5. The calibration system 182 includes a manifold 184 substantially identical to the manifold 172 shown in FIG. 3. Manifold 184 is connected by a flow line 186 and a pipe reducer fitting 188 to an adjustable pressure regulator 190. The inlet opening 192 of air regulator 190 is connected to an air supply (not shown) such as 100 pounds per square inch (psi) through conventional means such as by a quick disconnect hose fitting (not shown). The outlet end 184b of the manifold 184 is connected through an air line 192 to an end cap 194 having a small hole 196 extending therethrough, as shown in FIG. 6. The sensor element 170 is mounted into the manifold and locked therein by a threaded nut 198.

To calibrate the sensor 170, the line 174 can be connected to an air regulator equipped with a conventional gauge that can be set and controlled for 30 psi. First, prior to providing pressurized air flow through inlet 192, the sensor element 176 is adjusted to output a signal of, for example, 4 milliamps, which corresponds to a flow rate of zero cube meters per minute, through output line 174. Then, the air supply is connected to the air regulator and the pressurized air (i.e. 30 psi) corresponding to the inflation pressure of the tire mounted on the tire uniformity machine 110 shown in FIG. 2, is provided into the air inlet 192. Then the air flow is turned on, with the air regulator 190 set to the desired inflation pressure of the tire, and the air is allowed to leak through the hole 196 for a predetermined period of time, such as for example 3 minutes. Then, the sensor 170 is adjusted for 50% of the full scale value. The air flow is again stopped and, after the air flow reaches zero, the output a signal of the sensor 170 is checked to see if it is the same as before, i.e. 4 milliamps. Then, the sensor 170 is mounted into the manifold 172 in the inlet line 134 of the inflation system 130, as discussed hereinbefore.

In operation, referring to FIG. 2, tire 114 is mounted onto a machine rim 116 of the tire uniformity machine 110. Then the tire 114 is inflated with an air flow from the inflation system 130 of FIG. 3 through an inlet pipe 132 to a first pressure of about 45 psi to set the tire beads of tire 114 on the machine rims 116. Then the air pressure is decreased to the rated test pressure, which is typically about 30 psi, by the computer 122, 152 changing the signal to servo valve 160 after the pressure measured by pressure transducer 164 has reached a preset value. This total inflation process takes less than about 1.5 seconds. Once the tire 114 is inflated to the test pressure, the tire is loaded by the load wheel 112 of the force variation machine 110. When this is the first time that the tire has been tested on a force variation machine, the tire has a tendency to grow slightly requiring the inflation system 130 to supply more air to keep the tire at a constant pressure. Also, because of the numerous hoses and rotary couplings and seals on the tire uniformity machine 110, there are often small leaks that exist on the machine. The small changes to the air being supplied to the tire because of tire growth and/or machine defects are difficult to differentiate from a small leak in the tire itself. The air flow sensor 170 inserted in the air supply line 134 to the input side of the air booster 136 enables the measurement of the air flow using the caloric depletion method, as described hereinbelow. The air flow sensor 170 is mounted into the air supply line 134 with probe elements 178, 180 of the sensor element 176 disposed in a position parallel to and in the air flow stream. The air flow sensor 170 operates on the principle that both probe elements 178, 180 are in the air flow and one is heated slightly. Both of the probes 178, 180 have thermistors attached and the value of the heat quantity that is depleted across the probes can be measured. Since the air volume in the tire 114 changes slightly by the change in dimensional values and the measuring of the force variation of the tire, air is caused to flow in one direction across the flow sensor 170. Therefore, preferably, the air flow is measured when the tire uniformity machine 110 is making a second set of measurements relating to force variation near the conclusion of the machine cycle. It can be appreciated that within the same tire sizes, there will be a slight variation in the air flows measured because each tire is slightly different. Therefore, the measurements over a set of ten or more tires are averaged to develop a trend of values.

The sensor 170 outputs a 4 to 20 millliamp output signal through line 174 to the computer 122, 152. The data can be compared to data stored within the computer 122, 152 gathered from tires previously measured and averaged to filter out results caused by tire growth and machine leaks. Whenever a signal output is at the 50% or the full scale value, as set during the calibration described hereinbefore, there is an indication of a leak in the tire similar to the $\frac{1}{16}$th inch hole used in the calibration of the sensor 170. Even for a much smaller hole in the tire, the sensor is able to emit a significant signal that the computer can analyze and alert the operator as to a defect in the tire. For example, if the signal output of the sensor 170 is 20% to 100% of the full scale value, there is also an indication of a smaller hole, in the case of less than 50% than that originally calibrated for or a larger hole in the case of more than 50% than that originally calibrated for.

Moreover, since the data is collected and analyzed by the data collection computer 122, 152, and the sensors 170 have been calibrated on the same device, any abnormal signal for several tires can indicate excessive machine air leaks that can be signaled by alarms or other conventional techniques to maintenance personnel. Additionally, since the data is collected and analyzed by the data collection computer 122, 152, and the sensors 170 have been calibrated on the same device, signals that are too regular or perfect can indicate a malfunctioning sensor that can be signaled by alarms or other conventional techniques to maintenance personnel. Further, based on the data is collected and analyzed by the data collection computer 122, 152, the force variation machine can be automatically scheduled for maintenance.

Upon sensing a tire leak, the computer 152 can stop the tire uniformity machine 110 can be stopped, the tire can be marked with a special leak code and sent down a scrap conveyor.

In an exemplary method of detecting air leaks in tires (114) and in a tire testing machine (20), each of the tires being tested, typically on a production floor are mounted on the tire testing machine (a force variation machine) Each of the tires is inflated with an air flow from an inflation system (130) to a first pressure corresponding to the normal inflation pressure of the tire. The tires are maintained at the first pressure by continued supply of air from the inflation system into the tire. The flow of the continued supply of air is measured with the calorimetric flow sensor calibrated to output a sensor signal having a full scale value corresponding to the same model tire mounted on the tire testing machine with no air leaks in the model tire or the testing machine. The flow of the continued supply of air is compared with an averaged flow for previously measured tires mounted on the tire testing machine with no air leaks in the tires or the testing machine. A control signal is outputted (typically to a computer) indicating an air leak if the sensor signal is 20% to 100% of the full scale value. The calorimetric flow sensor is previously calibrated, as discussed hereinbefore, so that 50% of the full scale value corresponds to a pre-selected sized hole in the model tire, less than 50% is an indication of a smaller hole than the pre-selected hole in the model tire and more than 50% is an indication of a larger hole than the pre-selected hole in the model tire.

An alarm signal signaling is generated to notify maintenance to check for sensor failure if the sensor signal is at its minimum value for a predetermined number of tires mounted onto the testing machine. The tire testing machine can be stopped, the tire marked and/or the tire can be sent down a scrap conveyor (not shown) whenever the sensor signal is 20% to 100% of the full scale value.

Each of the tires is inflated with an air flow from the air inflation system 130 to a second pressure to set tire beads of the tire on machine rims of the testing machine and then each of the tires is deflated to the first pressure corresponding to a rated inflation pressure of the tire. A pressure control signal is set with a computer (152) corresponding to the first pressure to which the tire (114) will be inflated. The pressure control signal is directed through a signal line (158) to a pneumatic servo valve (160). A pneumatic air booster (136) disposed in an air line carrying the air flow to each of the tires is controlled with the pneumatic servo valve (160) so that the air flow through the pneumatic air booster is controlled in order that the pressure in the tire is at the first pressure set by the computer (152).

Next, each of the tires is loaded by a load wheel (112) of the tire testing machine (110) and the tires are subjected to normal conditions of mounting, inflation, load and rotational speed while measuring and collecting tire uniformity measurement data.

The invention has been described with reference to a preferred embodiment. Modifications and alterations may occur to others upon a reading and understanding of the specification. It is intended by the applicant to include all such modifications and alterations insofar as they come within the scope of the appended claims or the equivalents thereof.

What is claimed:

1. A method of detecting air leaks in tires and in a tire testing machine, including the steps of:
   mounting each of the tires on the tire testing machine;
   inflating each of the tires with an air flow from an inflation system to a first pressure;
   maintaining each of the tires at the first pressure by continued supply of air from the inflation system into the tire;
   measuring the flow of the continued supply of air with a calorimetric flow sensor calibrated to output a sensor signal;
   comparing the flow of the continued supply of air with an averaged flow for previously measured tires mounted on the tire testing machine with no air leaks in the tires or the testing machine; and
   outputting a control signal indicating an air leak if the sensor signal is 20% to 100% of a full scale value.

2. The method of claim 1 further including the step of:
   calibrating the calorimetric flow sensor so that 50% of the full scale value corresponds to a pre-selected sized hole in the model tire, less than 50% is an indication of a smaller hole than the pre-selected hole in the model tire and more than 50% is an indication of a larger hole than the pre-selected hole in the model tire.

3. The method of claim 1 further including the step of:
   generating an alarm signal signaling to check for sensor failure if the sensor signal is at minimum scale value for a predetermined number of tires mounted onto the testing machine.

4. The method of claim 1 further including the step of stopping the tire testing machine, marking the tire and/or sending the tire down a scrap conveyor whenever the sensor signal is 20% to 100% of the full scale value.

5. The method of claim 1 further including the steps of:
   inflating each of the tires with an air flow from an inflation system to a second pressure to set tire beads of the tire on machine rims of the testing machine; and
   deflating each of the tires to the first pressure corresponding to a rated pressure of the tire.

6. The method of claim 5 including the steps of:
   loading each of the tires by a load wheel of the tire testing machine; and
   subjecting each of the tires to normal conditions of mounting, inflation, load and rotational speed while measuring and collecting tire uniformity measurement data.

7. The method of claim 5 including the steps of:
   setting a pressure control signal with a computer corresponding to the first pressure to which the tire will be inflated;
   directing the pressure control signal through a signal line to a pneumatic servo valve;
   controlling a pneumatic air booster disposed in an air line carrying the air flow to each of the tires with the pneumatic servo valve so that the air flow through the pneumatic air booster is controlled in order that the pressure in the tire is at the first pressure set by the computer.

8. The method of claim 1 wherein the step of measuring the flow of the continued supply of air with a calorimetric flow sensor includes the step of;
   measuring the caloric depletion from the continued supply of air maintaining the tire at the first pressure.

9. The method of claim 8 wherein the step of measuring the flow of the continued supply of air includes the measurement of an air flow of less than 1 SCFM.

10. The method of claim 9 further including the step of inflating the tire with an air flow from the inflation system to a second pressure with an air flow of up to 1200 SCFM.

11. A system for detecting air leaks in tires and in a tire testing machine, including:
    means for mounting each of the tires on the tire testing machine;
    means for inflating each of the tires with an air flow from an inflation system to a first pressure;
    means for maintaining each of the tires at the first pressure by continued supply of air from the inflation system into the tire;
    means for measuring the flow of the continued supply of air with a calorimetric flow sensor calibrated to output a sensor signal;
    means for comparing the flow of the continued supply of air with an averaged flow for previously measured tires mounted on the tire testing machine with no air leaks in the tires or the testing machine; and
    means for outputting a control signal indicating an air leak if the sensor signal is 20% to 100% of a full scale value.

12. The system of claim 11 further including:
    means for calibrating the calorimetric flow sensor so that 50% of the full scale value corresponds to a pre-selected sized hole in the model tire, less than 50% is an indication of a smaller hole than the pre-selected hole in the model tire and more than 50% is an indication of a larger hole than the pre-selected hole in the model tire.

13. The system of claim 11 further including:
    means for generating an alarm signal signaling to check for sensor failure if the sensor signal is at a minimum scale value for a predetermined number of tires mounted onto the testing machine.

14. The system of claim 11 further including means for stopping the tire testing machine, marking the tire and/or sending the tire down a scrap conveyor whenever the sensor signal is 20% to 100% of the full scale value.

15. The system of claim 11 further including:

means for inflating each of the tires with an air flow from an inflation system to a second pressure to set tire beads of the tire on machine rims of the testing machine; and deflating each of the tires to the first pressure corresponding to a rated pressure of the tire.

16. The system of claim 15 including:

means for loading each of the tires by a load wheel of the tire testing machine; and means for subjecting each of the tires to normal conditions of mounting, inflation, load and rotational speed white measuring and collecting tire uniformity measurement data.

17. The system of claim 15 including:

means for setting a pressure control signal with a computer corresponding to the first pressure to which the tire will be inflated;

means for directing the pressure control signal through a signal line to a pneumatic servo valve; and means for controlling a pneumatic air booster disposed in an air line carrying the air flow to each of the tires with the pneumatic servo valve so that the air flow through the pneumatic air booster is controlled in order that the pressure in the tire is at the first pressure set by the computer.

18. The system of claim 11 wherein the means for measuring the flow of the continued supply of air with a calorimetric flow sensor includes:

means for measuring the caloric depletion from the continued supply of air maintaining the tire at the first pressure.

19. The system of claim 18 wherein the means for measuring the flow of the continued supply of air includes means for measuring an air flow of less than 1 SCFM.

20. The system of claim 19 further including means for inflating the tire with an air flow from the inflation system to a second pressure with an air flow of up to 1200 SCFM.

* * * * *